April 23, 1935. J. R. PARSONS 1,998,686
PROCESS OF PRODUCING CELLULAR CERAMIC PRODUCTS
Filed Sept. 9, 1933
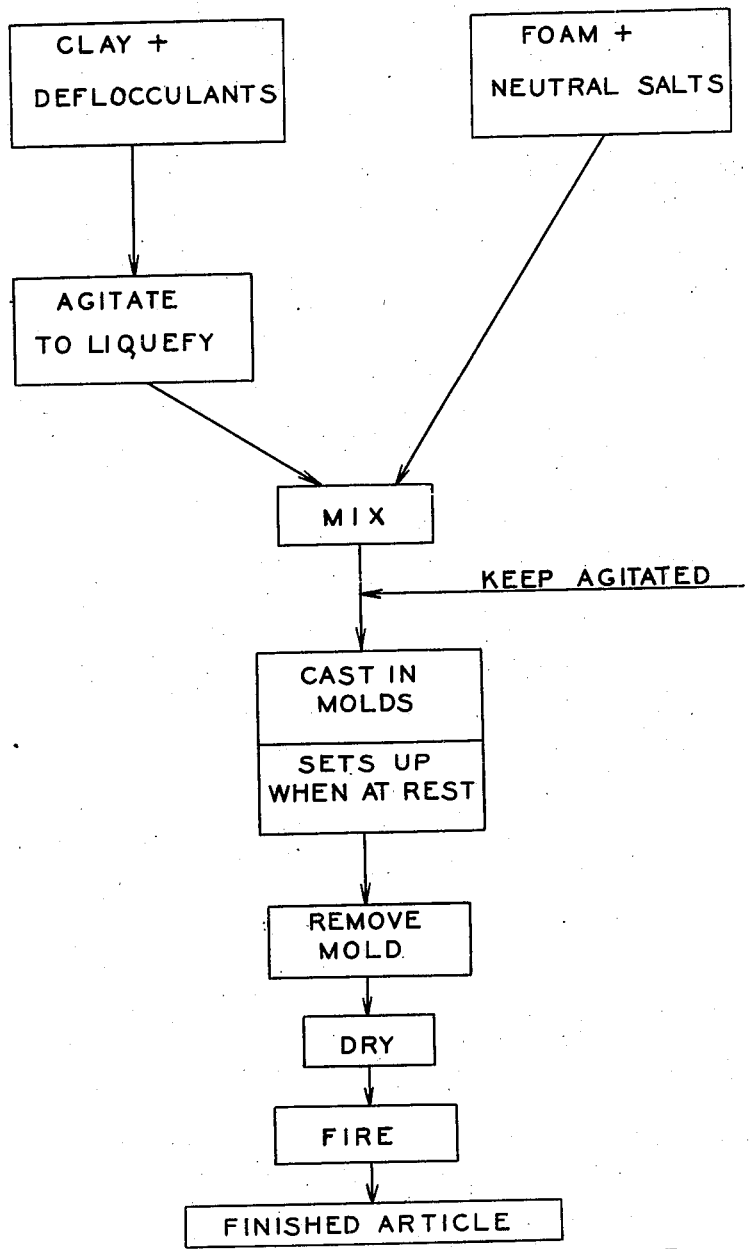

Patented Apr. 23, 1935

1,998,686

UNITED STATES PATENT OFFICE 1,998,686

PROCESS OF PRODUCING CELLULAR CERAMIC PRODUCTS

Joseph R. Parsons, Chicago, Ill., assignor to United States Gypsum Company, Chicago, Ill., a corporation of Illinois Application September 9, 1933, Serial No. 688,771

16 Claims. (Cl. 25—156)

The present invention relates to an improved process for producing cellular ceramic products.

In accordance with the method that forms the inventive subject matter of the present application, a foam is prepared, and admixed with a ceramic material while the latter is in a state of such colloidal dispersion that it will exhibit the maximum thixotropic properties, whereby a proper entrapping of the air bubbles of the foam within the ceramic mixture is obtained.

A thixotrope is a colloid, the properties of which are changed by mechanical treatment; and the term "thixotropy" is defined as a property, possessed by certain gels, of becoming fluid on shaking and coagulating again when left at rest. This property has been particularly noted in cases of suspensions of ferrous hydroxide and is usually explained on the theory that the liquefaction of the gel-like mass is due to a temporary mechanical destruction of the zones of the oriented molecules therein.

Clay, particularly when treated in accordance with the detailed description hereinbelow, exhibits marked thixotropic properties; that is to say, it will—in the presence of water—tend to set up to a self-sustaining mass, but this mass, by agitation, can temporarily be converted into a sufficiently fluid body to permit the incorporation therewith of a stable foam and the pouring of the mixture of foam and clay into molds, whereupon the clay will again set up so that the form in which it has been cast may be removed without the slumping down of the clay-foam mixture.

It has already been proposed, in accordance with the invention described in the patent to Richard Ericson, Reissue No. 18,606, to incorporate a preliminarily made foam with a ceramic mixture. A somewhat similar process, employing the principles of deflocculation and reflocculation, has also been described in the co-pending application of the present inventor, Serial No. 550,317, filed July 13, 1931, now matured into Patent No. 1,954,889 in which process, however, some difficulty was encountered because of the fact that before reflocculation became complete throughout the clay slip there was also a tendency to the collapse of the foam bubbles, with the result that definite predetermined cellularity or porosity could not be strictly controlled. By the use of the present process, however, the control of the distension of the clay mass by means of the foam or equivalent gaseous density reducing agent is possible. For example, a heavy clay slip is produced by blunging the raw materials of the following formula:

| | Grams |
|---|---|
| Water | 600 |
| Sodium carbonate | ½ |
| Sodium silicate | 12 |
| Black wad clay | 1250 |

The clay termed "black wad clay" is a commonly known siliceous ball clay, somewhat impure, and quite generally also employed for the purpose of wadding saggers. The above formula produces a slip of such a consistency that when recently mixed, or otherwise agitated, it is capable of being poured from one container into another; but after being allowed to stand for a few minutes, it will—because of its thixotropic properties—stiffen sufficiently to become incapable of being poured from the container into which it has been placed.

Slight changes in the water content may be made as required, because all clays do not act exactly the same, and there may be occasions when as much as 700 grams or more of water may be necessary to produce the desired fluidity on stirring. The determination of the amount of water, however, is readily made by a workman and, having once been determined for a batch of clay, may safely be accepted as a criterion for the amount of water to be used for a commercial batch.

The clay thus deflocculated, and already endowed with some thixotropic property, is then distended by incorporating therewith a sufficient amount of gas bubbles. This may be done by whipping the same and introducing compressed air but in much more conveniently accomplished by the expedient of preparing, in a separate vessel, a stiff foam by whipping together:

| | Grams |
|---|---|
| Water | 200 |
| Soap bark (saponin) | 6 |
| Sodium chloride | 1½ | and adding sufficient of this foam to the deflocculated heavy clay slip to give it the desired volume of bulk. In adding the foam to the clay slip, the clay slip is first thoroughly agitated so as to bring it into the state of maximum fluidity, whereupon the foam is added and the mixing continued for a short time to insure a thorough and even dissemination of the foam with the clay. After this has been accomplished, the mixture is injected or otherwise placed into a suitable mold wherein it is allowed to remain for a short time. It will not take very long before the stiffening of the mixture will take place. This stiffening will be more marked than it was before the addition of the foam, because of the presence in the foam,—and thus in the final mixture,—of the sodium chloride.

Applicant has found that the thixotropic property of such a deflocculated clay slip, particularly when deflocculated with sodium silicate, can be greatly enhanced by the introduction into the clay slip of a neutral alkali salt such as sodium chloride or sodium sulphate. These salts may be dissolved in water and introduced into the clay slip before, simultaneously with, or after the introduction of the foam, provided only that these salts—in the state of solution—be uniformly distributed through the final mixture. The increased stiffening effect of these salts may be explained on a number of different theories, none of which, however, has definitely been proved; and it is, therefore, unnecessary to discuss the reasons why the thixotropic effect should be greater in the presence of these salts. The fact remains that it is so and that applicant has discovered this property.

The method of forming the mixture of gaseous density reducing agent, deflocculated clay, and the neutral salt into the shape of the article to be made is somewhat a matter of indifference, but it is preferred to accomplish the molding by what is known as the casting process. Casting of clay mixtures is a common procedure in the ceramic art and requires no further explanation, as it is familiar to those skilled in that art. However, the articles may be cast in nonabsorbent metallic molds which can be used almost indefinitely.

Describing the operation in plain language, it may be said that the mixture of water, clay, gaseous density reducing agent, the deflocculant, and the neutral salt has a tendency to set up into a gel, and the present process has been termed the "gel process" of casting foam-containing or gaseous-density-reducing-agent-containing clay slips.

The further treatment of the material after it has been cast into the molds is as follows: As soon as the clay mixture has stiffened sufficiently, which usually takes but a few minutes, the sides of the mold are removed by lifting them off vertically, leaving the formed mass resting upon the pallet-bottom of the mold. Such pallets are commonly used in brick making. The formed mass is then slowly dried while still reposing on the pallet, and it will be found that it will dry without slumping and without destroying the cellular structure imparted thereto by the gaseous density reducing agent or foam. After drying, the product is fired in the usual manner to harden it and give it its final hard form. After cooling and removal from the kiln in which it has been fired, the product may then be ground to true it up, or the surface may be ground off so as to expose the cellular interior or the porous interior, as the case may be. It has been found that if a small amount of foam is used, the tendency of the brick is to become cellular, while if a larger quantity of foam is used, a sufficient number of dividing walls of the foam bubbles will break during drying and firing of the brick to render it connectedly porous. In the latter case, such a brick forms an excellent material for the correction of the acoustics of enclosed spaces, because of the property possessed by such a brick of absorbing impinging sound waves, thereby preventing their reflection.

While the foam described above was made with the aid of soap bark, it may be pointed out that a number of foam-producing materials may be employed; for example, one may employ a foam made from a rosin soap, either with or without the addition of a colloidal dispersion of casein, or the foam may be made from an aqueous dispersion of licorice, soft soap, or any foaming material which is not adversely affected by the presence of the sodium silicate and sodium carbonate and which likewise has no deleterious action upon the clay or the final body resulting from the firing of the clay body. The soap bark foam, however, is probably the least expensive and simplest to make, and constitutes the preferred form of foam for the present purpose.

The invention has found its chief application in the manufacture of heat insulating brick and in acoustic corrective material. However, the invention may also be employed, without the use of foam, as an improved method of casting clay slips, in which case the foam is omitted; but a neutral alkali salt, such as sodium chloride and sodium sulphate, is employed in conjunction with a deflocculating agent such as sodium carbonate and sodium silicate. In that case, all that is necessary is to mix the clay with the sodium carbonate and sodium silicate to deflocculate it, and then to add a small amount of a neutral salt preferably in the proportions indicated in the above formula. By keeping the mixture agitated, it will remain sufficiently fluid for casting but will stiffen or gel in the molds soon after being placed therein and left at rest.

It is to be understood in the foregoing specification and in the following claims that the words "clay" and "clay slip" include, in addition to straight clay bodies, such compounded bodies as whitewares, which consist of mixtures of clays with other ingredients such as flint and feldspar. The plastic properties, the capacity for deflocculation, and the thixotropic properties of such clay body mixtures, on gauging with water, are largely if not entirely contributed by the clay portion of the body.

The process herein described and claimed is illustrated by the diagrammatic flow sheet appearing on the drawing accompanying the present application.

What it is desired to protect by Letters Patent is the following:

1. The process of casting clay articles which comprises mixing clay, water, a deflocculant and a neutral alkali salt, agitating the mixture and rapidly placing it into molds wherein the mixture stiffens or gels to form a soft coherent mass when left at rest.

2. The process of casting clay articles which comprises mixing clay, water, an alkali reacting substance and a neutral alkali salt, agitating the mixture and rapidly placing it into molds wherein the mixture stiffens or gels to form a soft coherent mass when left at rest.

3. The process of casting clay articles which comprises mixing clay, water, sodium carbonate, sodium silicate and a neutral sodium salt, agitating the mixture and rapidly placing it into molds wherein the mixture stiffens or gels to form a soft coherent mass when left at rest.

4. The process of casting clay articles which comprises mixing clay, water, sodium carbonate, sodium silicate and sodium chloride, agitating the mixture and rapidly placing it into molds wherein the mixture stiffens or gels to form a soft coherent mass when left at rest.

5. The process of enhancing the thixotropic properties of clay which comprises adding thereto a deflocculant and a soluble neutral alkali salt.

6. The process of enhancing the thixotropic properties of clay which comprises adding thereto an alkaline deflocculant and a neutral sodium salt.

7. The process of enhancing the thixotropic properties of clay which comprises adding thereto sodium carbonate, sodium silicate and sodium chloride.

8. The process of producing cellular ceramic ware which comprises the steps of deflocculating a clay slip, adding foam and a neutral alkali salt thereto, agitating the mixture and rapidly casting it into molds wherein it gels as a result of the thixotropic properties thus imparted to the clay, thereby entrapping the foam bubbles.

9. The process of producing cellular ceramic ware which comprises the steps of deflocculating a clay slip, dispersing bubbles of a gas and a solution of a neutral salt therein, agitating the mixture thus produced and rapidly casting it into molds wherein it gels as a result of the thixotripoc properties thus imparted to the clay, thereby entrapping the gas bubbles.

10. The process as claimed in claim 9, wherein the neutral salt is a sodium salt.

11. The process as claimed in claim 9, wherein the neutral salt is sodium chloride.

12. The process as claimed in claim 8, wherein the foam is made of a solution of soap-bark in water.

13. The process as claimed in claim 8, wherein the foam is made of a solution of saponin.

14. The process of insuring the entrapping of a mass of gaseous bubbles in clay slip which comprises enhancing the thixotropic properties of said clay slip by adding a soluble neutral alkali salt thereto and dispersing said bubbles in the mixture.

15. The process of insuring the entrapping of a mass of gaseous bubbles in a deflocculated clay slip which comprises enhancing the thixotropic properties of said clay slip by adding sodium chloride thereto.

16. The process of producing cellular or porous ceramic articles which comprises preparing a deflocculated heavy clay slip; dissolving soap-bark and a neutral sodium salt in water and whipping the resultant solution into a foam; incorporating said foam with the clay slip with agitation; pouring the resultant fomaceous mixture into a mold while still fluid and allowing it to gel therein; removing the thus produced soft formed article, drying it, and firing it to produce a burnt ceramic article.

JOSEPH R. PARSONS.